(12) United States Patent
Komori et al.

(10) Patent No.: US 10,994,667 B2
(45) Date of Patent: May 4, 2021

(54) IMAGE CAPTURE DEVICE

(71) Applicant: Hitachi Automotive Systems, Ltd., Hitachinaka (JP)

(72) Inventors: Fumiaki Komori, Hitachinaka (JP); Ken Ohsumi, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 16/495,666

(22) PCT Filed: Mar. 27, 2018

(86) PCT No.: PCT/JP2018/012312
§ 371 (c)(1),
(2) Date: Sep. 19, 2019

(87) PCT Pub. No.: WO2018/190116
PCT Pub. Date: Oct. 18, 2018

(65) Prior Publication Data
US 2020/0017036 A1    Jan. 16, 2020

(30) Foreign Application Priority Data

Apr. 13, 2017   (JP) .............................. JP2017-079716

(51) Int. Cl.
*B60R 11/04* (2006.01)
*H04N 5/225* (2006.01)
(Continued)

(52) U.S. Cl.
CPC ................ *B60R 11/04* (2013.01); *G01C 3/02* (2013.01); *H04N 5/2252* (2013.01); *B60R 2011/0026* (2013.01)

(58) Field of Classification Search
CPC ......... B60R 11/04; G01C 3/00; H04N 5/2252
See application file for complete search history.

(56) References Cited

U.S. PATENT DOCUMENTS 10,288,986 B2 * 5/2019 Blake, III .............. G03B 17/55
2005/0001901 A1   1/2005 Eggers et al.
(Continued)

FOREIGN PATENT DOCUMENTS

EP    3 103 684 A1   12/2016
EP    3 173 289 A1    5/2017
(Continued)

OTHER PUBLICATIONS

International Search Report (PCT/ISA/210) issued in PCT Application No. PCT/JP2018/012312 dated Jul. 24, 2018 with English translation (five (5) pages).
(Continued)

*Primary Examiner* — Rowina J Cattungal
(74) *Attorney, Agent, or Firm* — Crowell & Moring LLP (57) ABSTRACT

The purpose of the present invention is to provide an image capture device which is capable of reducing the load exerted on window glass to which a bracket is adhered, when an on-vehicle camera is attached to the bracket. The present invention is characterized by being provided with: an image capture unit for capturing an image; and a holding part for holding the image capture unit. The present invention is further characterized in that: the image capture unit is provided with a part to be supported provided with a short part having a prescribed length, and a long part having a longer length than the short part; the holding part is provided with a support part which supports the part to be supported, and a pressing part which is provided facing the support part, and which generates a pressing force in the direction of the support part; and, when positioned between the support part and the pressing part, the part to be supported can be switched between a first state in which the short part is positioned in a direction linking the support part and the pressing part, and a second state in which the long part is
(Continued)

positioned in the direction linking the support part and the pressing part, and receives a stronger pressing force than that in the first state from the pressing part.

7 Claims, 6 Drawing Sheets

(51) Int. Cl.
  *G01C 3/02* (2006.01)
  *B60R 11/00* (2006.01)

(56) References Cited

U.S. PATENT DOCUMENTS

| | | | |
|---|---|---|---|
| 2015/0015713 A1* | 1/2015 | Wang | H04N 7/18 |
| | | | 348/148 |
| 2015/0042804 A1* | 2/2015 | Okuda | B60R 11/04 |
| | | | 348/148 |
| 2015/0109447 A1* | 4/2015 | Okuda | B60R 11/04 |
| | | | 348/148 |
| 2016/0009230 A1* | 1/2016 | Miyado | B60R 11/00 |
| | | | 224/482 |
| 2016/0318458 A1 | 11/2016 | Wato et al. | |

FOREIGN PATENT DOCUMENTS

| | | |
|---|---|---|
| EP | 3 173 290 A1 | 5/2017 |
| JP | 2005-22643 A | 1/2005 |
| JP | 2012-144115 A | 8/2012 |
| JP | 2013-144475 A | 7/2013 |
| JP | 2013-186278 A | 9/2013 |
| JP | 2013-193558 A | 9/2013 |
| JP | 2016-16830 A | 2/2016 |
| JP | 2016-203952 A | 12/2016 |

OTHER PUBLICATIONS

Japanese-language Written Opinion (PCT/ISA/237) issued in PCT Application No. PCT/JP2018/012312 dated Jul. 24, 2018 (three (3) pages).

* cited by examiner

IMAGE CAPTURE DEVICE

TECHNICAL FIELD

The present invention relates to an image capture device, and more particularly to an image capture device mounted on a vehicle and capable of capturing an image of the surroundings.

BACKGROUND ART

With increased awareness of preventive safety in recent years, there has been increased attention to stereo cameras that can be mounted on vehicles to determine the distance to an object such as a preceding vehicle or a pedestrian. In view of necessity to be able to measure the distance with high accuracy in application to avoid collision with an object, the stereo camera is to be secured desirably at a prescribed position of a vehicle.

Furthermore, there is a growing need to mount a stereo camera not only on large and medium-sized vehicles but also on small vehicles such as mini-vehicles. In particular, as a structure for installing the stereo camera on a small vehicle, a structure of mounting the camera on the windshield is becoming a mainstream in consideration of loading efficiency in vehicle compartment.

For example, JP 2012-144115 discloses a structure in which a bracket is attached beforehand to a windshield of a vehicle, and then an on-vehicle camera such as a stereo camera is attached to the bracket.

CITATION LIST

Patent Literature

PTL 1: JP 2012-144115 A

SUMMARY OF INVENTION

Technical Problem

In a bonding process to bond the windshield and the vehicle body out of vehicle assembly processes, the time needed before the process of attaching the on-vehicle camera to the windshield becomes feasible is shorter compared to the time needed for completely solidifying this bonding. Therefore, in consideration of the production efficiency of the vehicle, the on-vehicle camera needs to be attached to the windshield in a state where the adhesion between the windshield and the vehicle body is incomplete.

In a case where the adhesion of the windshield to the vehicle body has not reached complete solidification in attachment of the on-vehicle camera, an occurrence of high load applied to the windshield would degrade the installation accuracy and camera assembly accuracy due to the displacement of the windshield. This would have a great impact on small vehicles in particular because of light weight of the windshield. For this reason, it is desirable to reduce the load applied to the windshield at the time of attaching an on-vehicle camera.

In conventional technologies, however, no satisfactory consideration has been given to the load applied to the windshield at the time of attaching the on-vehicle camera. For example, in the structure described in JP 2012-144115A, a biasing member for biasing the on-vehicle camera is provided on the inner surface (in a direction perpendicular to the surface of the windshield) of the bracket bonded to the windshield. When attaching the on-vehicle camera, locking claws of the on-vehicle camera are fit into locking receptacles of the bracket while the on-vehicle camera is pressed against the biasing force of the biasing member, with no consideration of reduction of the load onto the windshield.

The purpose of the present invention is to provide an image capture device which is capable of reducing the load exerted on window glass to which a bracket is bonded, when an on-vehicle camera is attached to the bracket.

Solution to Problem

In order to achieve the above aim, the present invention is characterized by including: an image capture unit for capturing an image; and a holding part for holding the image capture unit. The present invention is further characterized in that: the image capture unit includes a part to be supported provided with a short part having a prescribed length, and a long part having a longer length than the short part; the holding part includes a support part which supports the part to be supported, and a pressing part which is provided facing the support part, and which generates a pressing force in the direction of the support part; and, when positioned between the support part and the pressing part, the part to be supported can be switched between a first state in which the short part is positioned in a direction linking the support part and the pressing part and a second state in which the long part is positioned in the direction linking the support part and the pressing part and that receives a stronger pressing force than in the first state from the pressing part.

Advantageous Effects of Invention

According to the present invention, it is possible to provide an image capture device which is capable of reducing the load exerted on window glass to which a bracket is bonded, when an on-vehicle camera is attached to the bracket.

Problems, configurations, and effects other than in the above will become apparent by the following description in the embodiments.

DESCRIPTION OF EMBODIMENTS

Hereinafter, an embodiment of an image capture device according to the present invention will be described with reference to the drawings.

Figure 1:
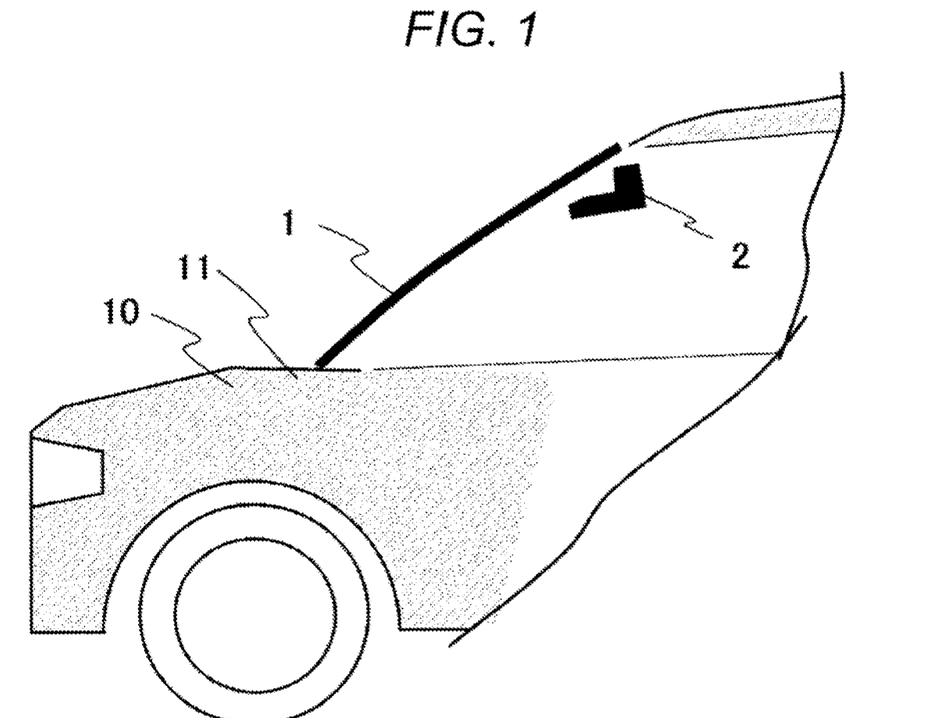
FIG. 1 is a side sectional view illustrating an attachment position of a stereo camera according to an embodiment of the present invention.

FIG. 1 is a side sectional view illustrating an attachment position of a stereo camera according to an embodiment of the present invention.

In the present embodiment, a case where a stereo camera 2 is attached to a windshield 1 of a vehicle 10 will be described. In a small-sized vehicle, it is a mainstream to attach the stereo camera 2 to the windshield 1 in consideration of the loading efficiency in order to ensure the vehicle compartment space or the like. At this time, the stereo camera 2 is desirably disposed at the top of the windshield 1 so as not to obstruct the driver's (operator's) view and not to make the driver feel disturbed.

The windshield 1 is bonded to the vehicle body 11 in an assembly process of the vehicle 10. Before bonding the windshield 1 to the vehicle body 11, a bracket 4 (refer to FIG. 4) described below is bonded to the windshield 1. In the process of bonding the windshield 1 to the vehicle body 11, the bracket 4 is firmly fixed to the windshield 1.

The present invention is not limited to the case where the stereo camera 2 as an image capture unit that captures an image according to the present embodiment is attached to the windshield 1 being window glass facing front of a vehicle, and the stereo camera 2 may be attached to the side or rear window glass of the vehicle.

Figure 2:
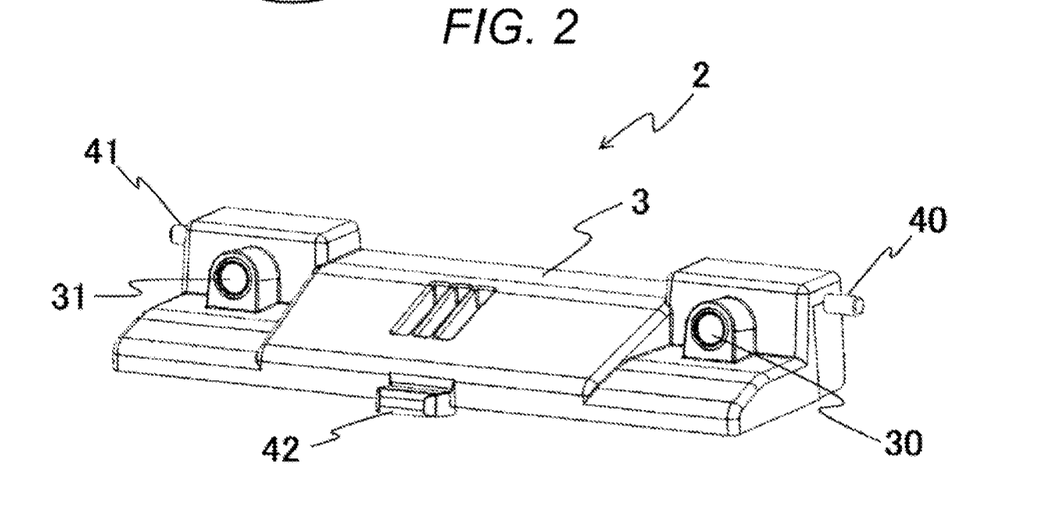
FIG. 2 is a perspective view of a stereo camera 2 illustrated in FIG. 1 as viewed from the front side.

FIG. 2 is a perspective view of the stereo camera 2 illustrated in FIG. 1 as viewed from the front side. In the present embodiment, the front is a direction in which an imaging target of the stereo camera 2 exists.

The stereo camera 2 includes: a camera unit 30 (left camera unit) for capturing an image; a camera unit 31 (right camera unit) for capturing an image; and a housing 3 in which the camera unit 30 is disposed on the right side as viewed from the front side and the camera unit 31 is disposed on the left side as viewed from the front side. The stereo camera 2 further includes, in the housing 3, a processing unit (not illustrated) that generates a distance image by calculating parallax from images captured by the camera unit 30 and the camera unit 31 and that executes processing of recognizing an object in front of the vehicle on the basis of the distance image.

The image capture unit for capturing an image according to the present invention is not limited to the configuration having two camera units 30 and 31 as in the stereo camera 2. The present invention is applicable to an image capture unit having one camera unit, or to an image capture unit having three or more camera units.

The housing 3 includes: a protrusion 40 (left protrusion) provided on the right side as viewed from the front side and protruding to the right side in the drawing; a protrusion 41 (right protrusion) provided on the left side as viewed from the front side and protruding to the left side in the drawing; and a protrusion 42 (front protrusion) provided on substantially the center on the front side and protruding to the front side. The housing 3 including the protrusion 40, the protrusion 41, and the protrusion 42 is integrally molded by die casting, for example. Each of the protrusion 40, the protrusion 41, and the protrusion 42 is a part to be supported when the stereo camera 2 is attached to the bracket 4 (refer to FIG. 4) described below.

When the stereo camera 2 is attached to the bracket 4 in the present embodiment, the bracket 4 supports the stereo camera 2 at three points by the three parts to be supported, that is, the protrusion 40, the protrusion 41, and the protrusion 42. At this time, the stereo camera 2 is disposed such that the optical axis of the camera unit 30 and the optical axis of the camera unit 31 are parallel to each other and to the vehicle body (that is, parallel to the road surface), making it possible to achieve higher recognition accuracy for the object in the vehicle front by the stereo camera 2. Therefore, attachment accuracy of the stereo camera 2 to the vehicle 10 is important.

Figure 3:
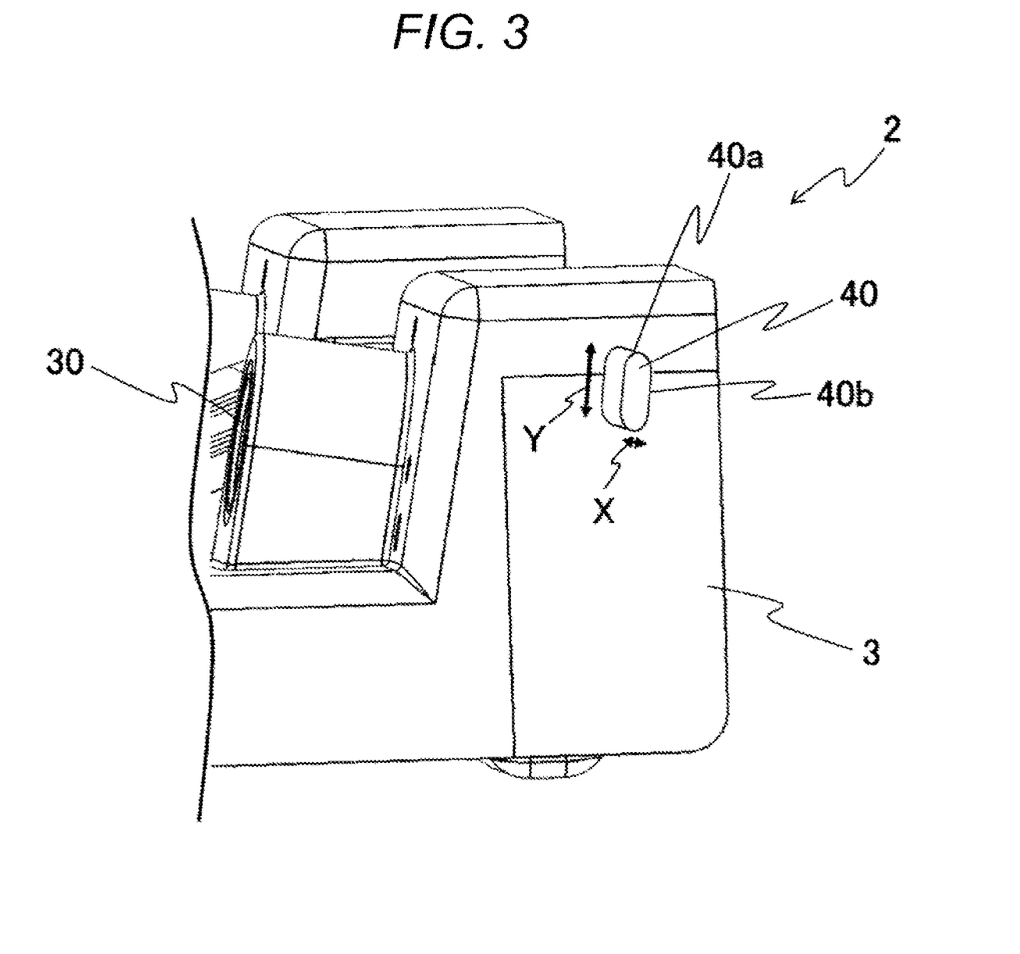
FIG. 3 is a perspective view of the stereo camera 2 illustrated in FIG. 2 as viewed from the right side, as an enlarged view of the vicinity of a protrusion 40.

FIG. 3 is a perspective view of the stereo camera 2 illustrated in FIG. 2 as viewed from the right side, as an enlarged view of the vicinity of a protrusion 40.

The protrusion 40 includes a short part 40a having a length X and a long part 40b having a length Y. The length Y is longer than the length X. The protrusion 40 of the present embodiment has a cross-sectional shape having two semicircles expanding outward connected at their ends with straight lines. The present invention, however, is not limited to this shape, and may have a cross-sectional shape being oval or rectangular, or may have any shape as long as it has a short part with a short length and a long part longer than the short part. However, since the protrusion 40 is pivoted between the support part 50a (refer to FIG. 4) and the pressing part 51a (refer to FIG. 4) as described below, in order to achieve smooth pivoting, the surface of the protrusion 40 to come in contact with the support part 50a and the pressing part 51a has desirably no corners in the pivotal direction, and in a case where the cross-sectional shape of the protrusion 40 is rectangular, for example, it would be desirable to smooth the surface by chamfering.

Note that the above description for the protrusion 40 can similarly be applied to the protrusion 41, and thus, description for the protrusion 41 will be omitted.

Figure 4:
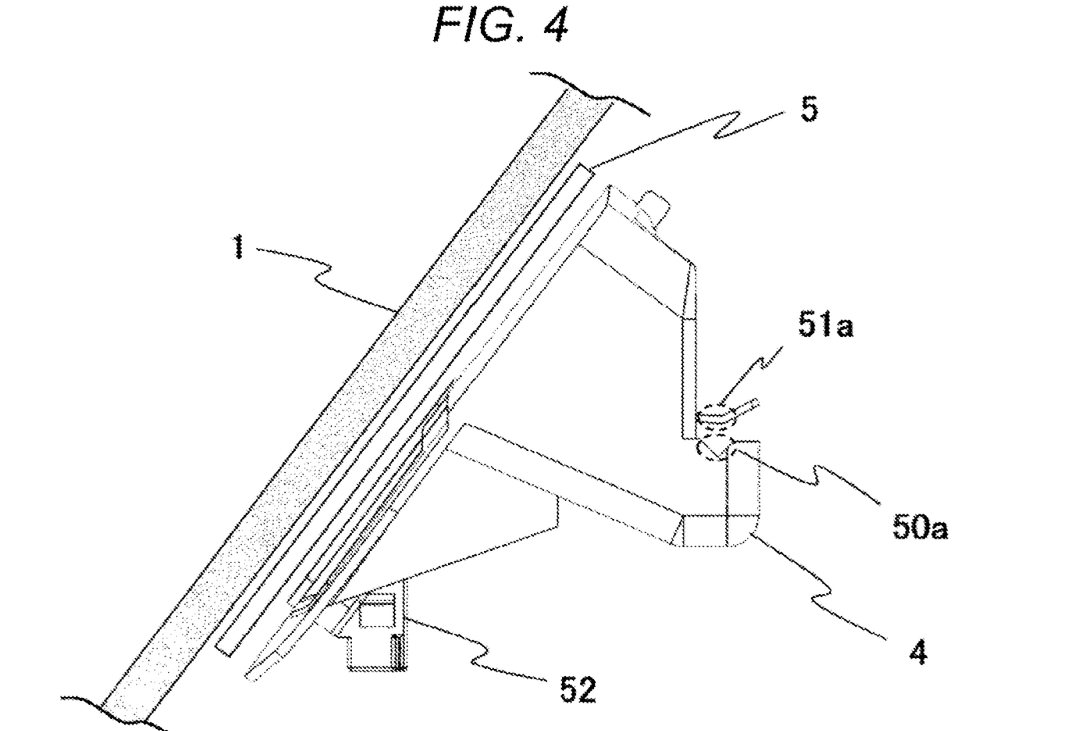
FIG. 4 is a side view illustrating a state where a bracket according to an embodiment of the present invention is bonded to a windshield 1.

FIG. 4 is a side view illustrating a state where a bracket according to an embodiment of the present invention is bonded to a windshield 1. The left of the figure corresponds to the front side, and the right side of the figure corresponds to the rear side.

The stereo camera 2 illustrated in FIG. 1 is to be attached to the bracket 4. In the present embodiment, the bracket 4 is formed of a synthetic resin. However, a plate spring 53a (refer to FIG. 6), a plate spring 53b (refer to FIG. 6), and a plate spring 54 (refer to FIG. 10) described below are formed of a metal plate spring instead of synthetic resin. Between the windshield 1 and the bracket 4, a connecting member 5 (for example, an acrylic resin double-sided tape or an adhesive) is disposed to bond the windshield 1 and the bracket 4 so as to secure the bracket 4.

The bracket 4 includes a support part 50a (left support part) and a pressing part 51a (left pressing part) corresponding to the protrusion 40 of the stereo camera 2; a support part 50b (right support part) (refer to FIG. 6) and a pressing part 51b (right pressing part) (refer to FIG. 6) corresponding to the protrusion 41 of the stereo camera 2; and a support part 52 (front support part) corresponding to the protrusion 42 of the stereo camera 2. The bracket 4 supports the stereo camera 2 at three points, that is, by the support part 50a and the pressing part 51*a*, the support part 50*b* and the pressing part 51*b*, and the support part 52.

Figure 5:
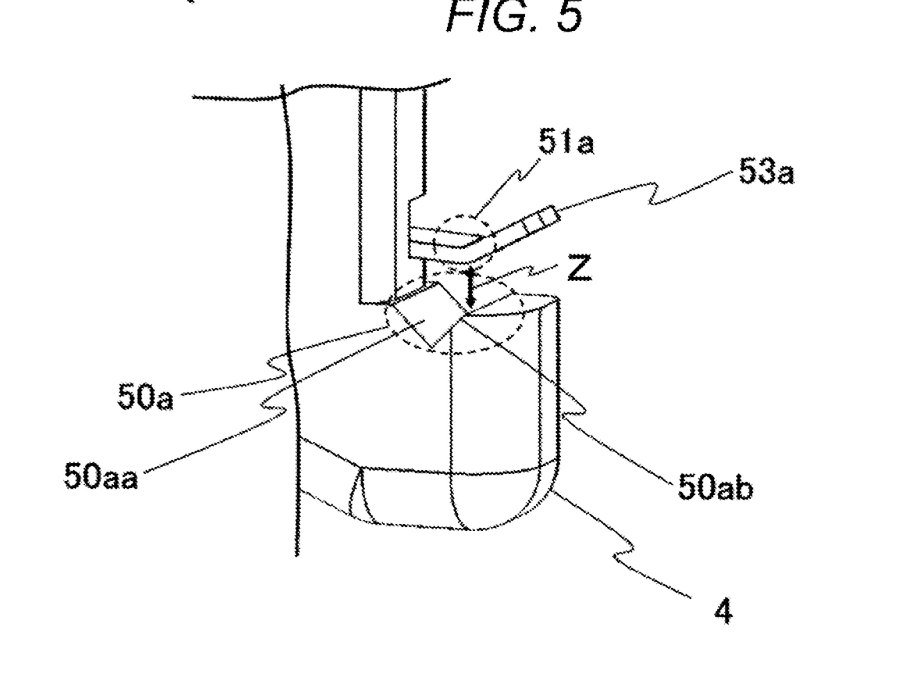
FIG. 5 is an enlarged perspective view illustrating the vicinity of a support part 50a and a pressing part 51a on the left side of the bracket 4 illustrated in FIG. 4.

FIG. 5 is an enlarged perspective view illustrating the vicinity of a support part 50*a* and a pressing part 51*a* on the left side of the bracket 4 illustrated in FIG. 4.

The support part 50*a* is formed with a recess having a surface 50*aa* and a surface 50*ab* in a hook shape as viewed from the side. In the present embodiment, the surface 50*aa* and the surface 50*ab* are formed at an angle of substantially 90° to each other. With this structure of the support part 50*a*, the protrusion 40 can be stably supported by the surface 50*aa* and the surface 50*ab* when the protrusion 40 formed on the housing 3 of the stereo camera 2 is supported, leading to high accuracy in attaching the stereo camera 2 to the bracket 4.

The pressing part 51*a* is a mechanism that presses the protrusion 40 of the stereo camera 2. When the long part 40*b* of the protrusion 40 is positioned between the pressing part 51*a* and the support part 50*a*, the pressing part 51*a* presses the protrusion 40 to be pressed against the support part 50*a* to secure the protrusion 40.

The pressing part 51*a* is a portion of the plate spring 53*a* (refer to FIG. 6) to come in contact with the protrusion 40. When the protrusion 40 is not positioned between the pressing part 51*a* and the support part 50*a*, the support part 50*a* and the pressing part 51*a* are separated by a distance Z in a direction connecting the support part 50*a* and the pressing part 51*a*. That is, a gap of the distance Z is provided between the support part 50*a* and the pressing part 51*a*. In the present embodiment, the distance Z is longer than a length X which is the length of the short part 40*a* of the protrusion 40 and shorter than a length Y which is the length of the long part 40*b*. The present invention is not limited to this, and the distance Z may be equal to the length X which is the length of the short part 40*a* of the protrusion 40 or may be shorter than the length X. Still, it is desirable for the distance Z to be longer than the length X, since this would achieve smooth insertion of the short part 40*a* of the protrusion 40 between the pressing part 51*a* and the support part 50*a*.

Since the length Y of the long part 40*b* is longer than the length X of the short part 40*a*, the pressing part 51*a* presses the protrusion 40 with stronger pressing force when the long part 40*b*, rather than the short part 40*a*, is positioned between the support part 50*a* and the pressing part 51*a*.

Note that the shape of the support part 50*a* (a hook-shaped recess) may be the shape formed by the surface 50*aa* and the surface 50*ab* forming an angle of 90° with each other as in the present embodiment (having L-shaped side surface), or other shapes such as a shape formed by two surfaces forming an acute angle (having V-shaped side surface), a shape formed by two surfaces forming an obtuse angle, a shape formed by three or more surfaces, or a U-shaped side surface.

Figure 6:
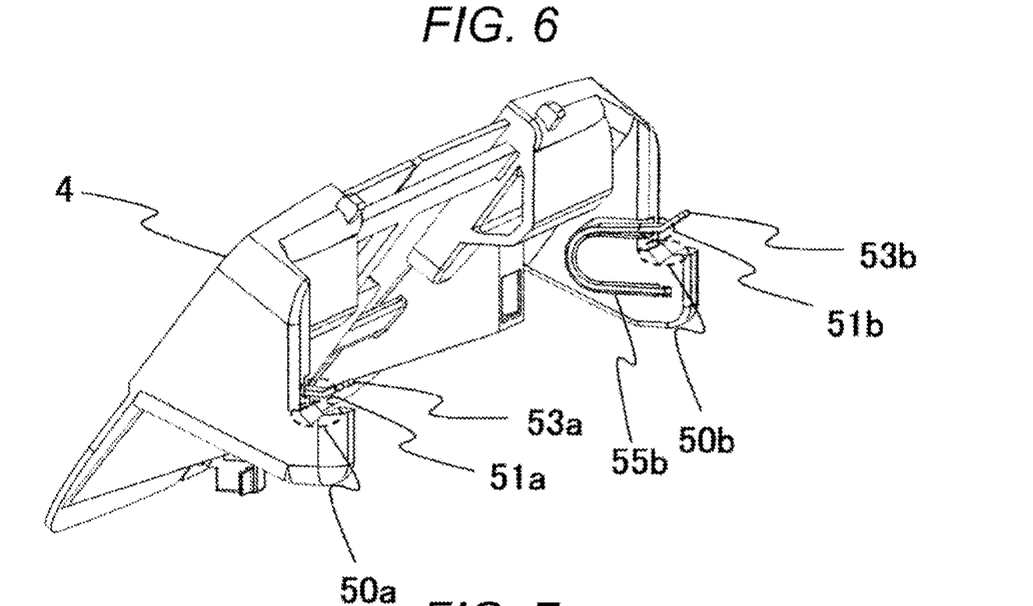
FIG. 6 is a perspective view of the bracket 4 illustrated in FIG. 4 as viewed from the rear side.

The support part 50*b* has a configuration similar to the support part 50*a*. The pressing part 51*b* has a configuration similar to the pressing part 51*a*. Therefore, detailed description of the support part 50*b* and the pressing part 51*b* will be omitted. The pressing part 51*b* is a portion of the plate spring 53*b* to come in contact with the protrusion 41. When a long part (not illustrated) of the protrusion 41 is positioned between the pressing part 51*b* and the support part 50*b*, the pressing part 51*b* presses the protrusion 41 to be pressed against the support part 50*b* to secure the protrusion 41.

FIG. 6 is a perspective view of the bracket 4 illustrated in FIG. 4 as viewed from the rear side.

The portion between the left side surface of the bracket 4 having the support part 50*a* and the right side surface of the bracket 4 having the support part 50*b* includes a space for storing the stereo camera 2, so as to form a structure that facilitates insertion of the stereo camera 2.

Furthermore, the bracket 4 includes a groove 55*b* for accommodating the plate spring 53*b*. Although a groove for accommodating the plate spring 53*a* is also provided in the bracket 4, illustration is omitted since this is similar to the groove 55*b*.

Figure 7:
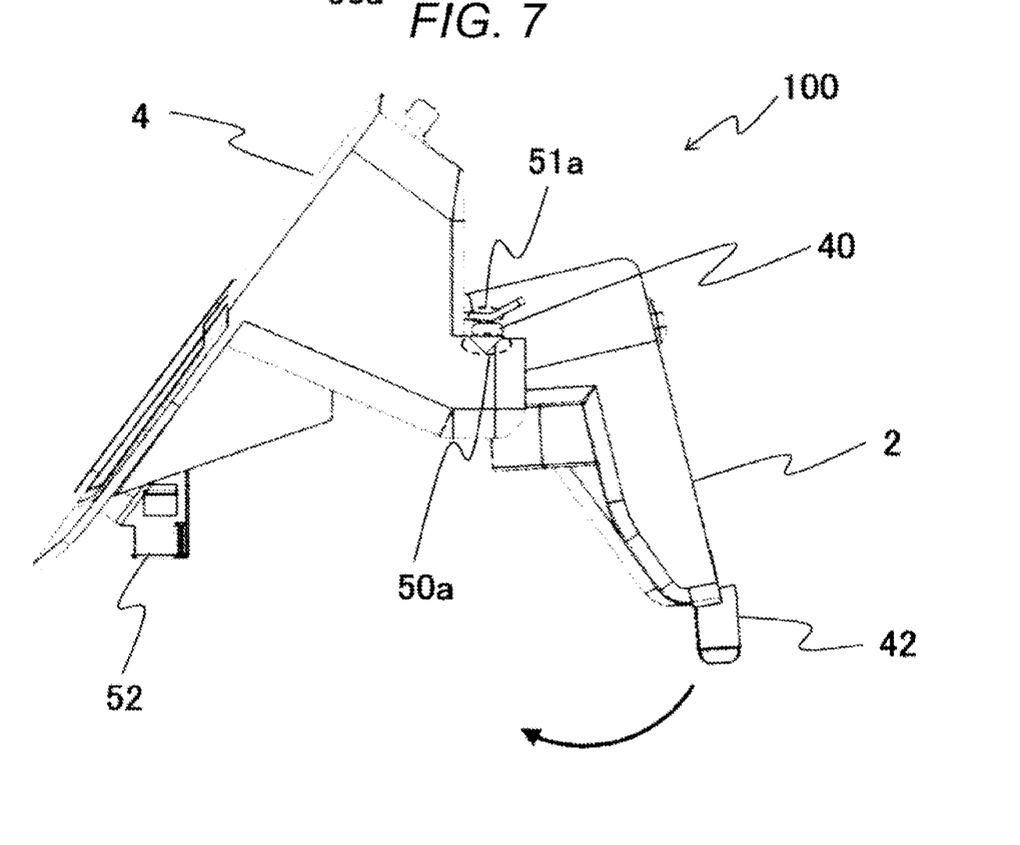
FIG. 7 is a side view illustrating a state of attaching the stereo camera 2 illustrated in FIG. 2 to the bracket 4 illustrated in FIG. 4.

FIG. 7 is a side view illustrating a state of attaching the stereo camera 2 illustrated in FIG. 2 to the bracket 4 illustrated in FIG. 4. The image capture device 100 according to the present embodiment includes the bracket 4 and the stereo camera 2.

In the present embodiment, it is assumed that the process of attaching the stereo camera 2 to the bracket 4 is performed in a state where the bonding of the windshield 1 to the vehicle body 11 is incomplete in the assembly process of the vehicle 10.

First, the protrusions 40 and 41 provided on the stereo camera 2 are respectively inserted into the support parts 50*a* and 50*b* provided on the bracket. At this time, the direction in which the short part 40*a* (length X) of the protrusion 40 is positioned is set as an insertion direction in the gap of the distance Z in the direction connecting the support part 50*a* and the pressing part 51*a*. This setting eliminates resistance to prevent the insertion of the protrusions in a course before the protrusion 40 reaches the support part 50*a* since the distance Z of the gap is longer than the length X of the short part 40*a*. That is, no load is applied to the windshield 1 until the protrusion 40 of the stereo camera 2 reaches the support part 50*a*. Note that the above description of the protrusion 40 may similarly be applied to the protrusion 41.

Figure 8:
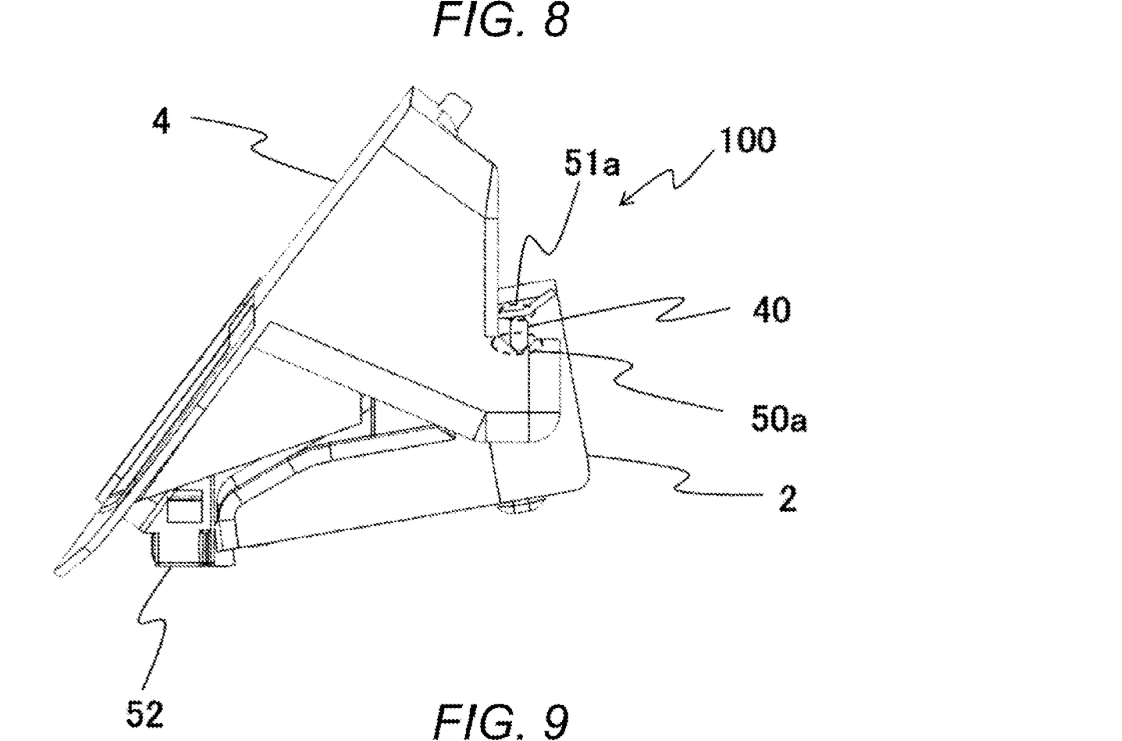
FIG. 8 is a side view illustrating a state where the stereo camera 2 is pivoted about protrusions 40 and 41 from the state of FIG. 7.

Thereafter, the stereo camera 2 is pivoted about the protrusion 40 and the protrusion 41 as axes in a state where the protrusion 40 is positioned between the pressing part 51*a* and the support part 50*a* and the protrusion 41 positioned between the pressing part 51*b* and the support part 50*b* so as to set the protrusion 42 of the stereo camera 2 to face the direction of the support part 52 of the bracket 4. FIG. 8 illustrates this state.

FIG. 8 is a side view illustrating a state where the stereo camera 2 is pivoted about protrusions 40 and 41 from the state of FIG. 7.

With the pivoting movement of the stereo camera 2 from the state of FIG. 7 to the state of FIG. 8, the stereo camera 2 changes its posture, and performs a direction change from the direction in which the short part 40*a* of the protrusion 40 is positioned in the gap in the direction connecting the support part 50*a* and the pressing part 51*a* to the direction in which the long part 40*b* of the protrusion 40 is positioned in the gap in the direction connecting the support part 50*a* and the pressing part 51*a*.

In the state of FIG. 8, the length Y of the long part 40*b* of the protrusion 40 is longer than the distance Z in the gap in the direction connecting the support part 50*a* and the pressing part 51*a*, and thus, the pressing force by the pressing part 51*a* greatly affects the protrusion 40. The protrusion 40 is engaged into the hook-shaped recess of the support part 50*a*, and the plate spring 53*a* of the pressing part 51*a* is secured to a groove of the bracket 4 (groove for the plate spring 53*a* similar to the groove 55*b* for the plate spring 53*b* illustrated in FIG. 6). With this configuration, the load on the windshield 1 when the stereo camera 2 is attached to the bracket 4 can be minimized. Note that the above description of the protrusion 40 may similarly be applied to the protrusion 41.

Figure 9:
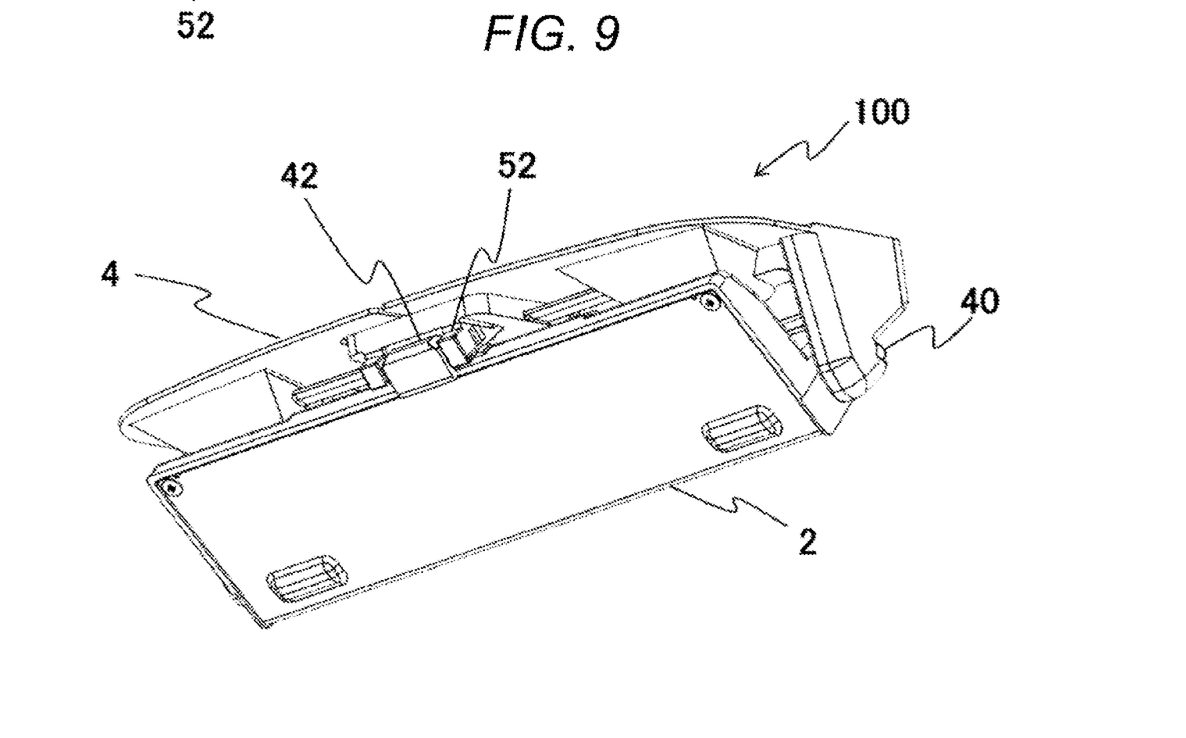
FIG. 9 is a view illustrating a state where a protrusion 42 of the stereo camera 2 is inserted into a support part 52 of the bracket 4 in the state illustrated in FIG. 8, as a perspective view from below.

FIG. 9 is a view illustrating a state in which the protrusion 42 of the stereo camera 2 is inserted into the support part 52 of the bracket 4 in the state illustrated in FIG. 8, being a perspective view seen from below.

In the state of FIG. 8, the left and right protrusions 40 and 41 of the stereo camera 2 are supported by the support part 50a and the support part 50b of the bracket 4. As illustrated in FIG. 9, the protrusion 42 of the stereo camera 2 is simply disposed side by side with the support part 52 of the bracket 4. In this state, it is possible to suppress application of load from the protrusions 42 and the support part 52 onto the windshield 1.

Figure 10:
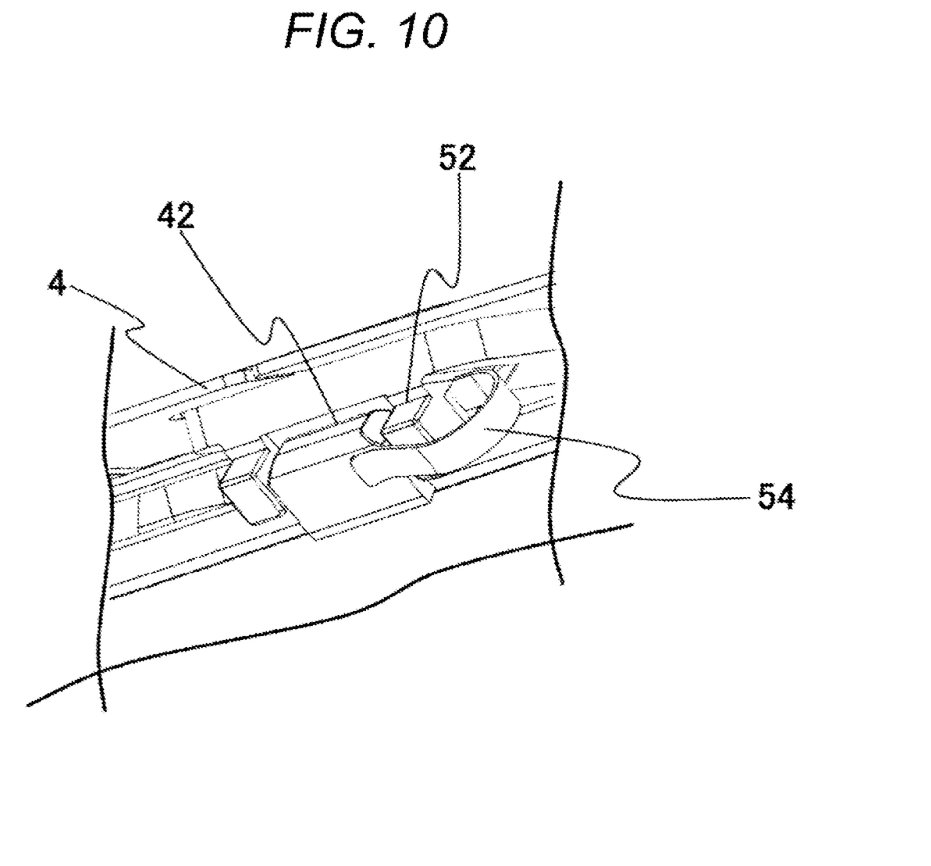
FIG. 10 is a view illustrating a state of securing the protrusion 42 from the state illustrated in FIG. 9, as a perspective view of the vicinity of the protrusion 42 from below.

FIG. 10 is a view illustrating a state of securing the protrusion 42 from the state illustrated in FIG. 9, as a perspective view of the vicinity of the protrusion 42 from below.

In the present embodiment, the plate spring 54 is used to secure the protrusion 42 to the support part 52. The plate spring 54 is assembled to the support part 52 and the protrusion 42, and the plate spring 54 sandwiches the support part 52 and the protrusion 42 so as to secure the protrusion 42 to the support part 52. The assembly of the plate spring 54 is performed by sliding the plate spring 54 from the side up to a position to sandwich the support part 52 and the protrusion 42. The sliding direction of the plate spring 54 is a direction substantially parallel to the surface of the windshield 1, involving no generation of force to press the surface of the windshield 1, making it possible to suppress application of load to the windshield 1.

As described above, according to the present embodiment, with the mounting structure using three-point support including the protrusion 40, the protrusion 41 and the protrusion 42 of the stereo camera 2, and including the support part 50a, the support part 50b and the support part 52 of the bracket 4, the stereo camera 2 can be attached to the windshield 1 with a minimum load on the windshield 1.

In the present embodiment, the three point support has been described with regard to the attaching operation of the stereo camera 2. However, a plurality of front protrusions may be provided in addition to the single protrusion 42. For example, two front protrusions may be provided.

In view of enhancement of the holding power of the bracket 4 for holding the stereo camera 2, the number of protrusions on both sides of the stereo camera 2 are not limited to one on each of the left and right sides of the protrusion 40 and the protrusion 41, but a plurality of protrusions may be provided on each of sides. That is, even with the plurality of protrusions, it is still possible to obtain the effect of minimizing the load on the windshield 1.

Furthermore, the present embodiment uses a configuration in which the stereo camera 2 is pivoted about the protrusions 40 and 41 as the axes to switch the protrusion 40 positioned in the gap connecting the support part 50a and the pressing part 51a from the short part 40a to the long part 40b. The present invention, however, is not limited to this, and for example, the stereo camera 2 may be slid relative to the bracket 4 in a direction substantially parallel to the surface of the windshield 1 to switch a portion positioned between the support part and the pressing part from the short part to the long part.

That is, the present embodiment uses a configuration in which the protrusion 40 arranges the short part 40a and the long part 40b in the circumferential direction, and the short part 40a and the long part 40b are switched by the rotation of the protrusion 40. The present invention, however, is not limited to this. For example, the protrusion may arrange the short part and the long part in the linear direction, and the position between the pressing part and the support part may be switched between the short part and the long part by sliding forward movement or sliding backward movement of the protrusion.

Furthermore, for example, it is allowable to form a route on which the protrusion passes between the pressing part and the support part, and into which the protrusion is to be inserted from an entrance up to a point where the pressing part presses the protrusion so as to be pressed against the support part (hereinafter referred to as a "second point") by using a first path formed in a direction substantially perpendicular to the surface of the windshield 1 from the entrance to a first point and by using a second path bent at the first point and formed in a direction substantially parallel to the surface of the windshield 1 from the first point to the second point, and also allowable to have a configuration in which the protrusion arranges the short part and the long part in the circumferential direction, the protrusion slides in a direction substantially perpendicular to the length direction of the short part (direction substantially perpendicular to the surface of the windshield 1) so as to advance on the first path from the entrance to the first point (distance of a gap of the first path (path width) is longer than the length of the short part), the protrusion change its sliding direction at the first point and slides in a direction perpendicular to the length direction of the long part (direction substantially parallel to the surface of the windshield 1) to advance on the second path from the first point to the second point (distance of a gap of the second path (path width) is shorter than the length of the long part) so as to allow the position between the pressing part and the support part to be switched between the short part and the long part.

In addition, it is not necessary to have a configuration in which one protrusion includes both the long part and the short part, and instead, one protrusion may include the long part and another protrusion may include the short part.

Furthermore, while the protrusion 40 formed on the housing 3 has a shape symmetrical in the left-right and up-down directions with respect to the center of the protrusion in the present embodiment, the protrusion 40 need not necessarily have a symmetrical shape.

Furthermore, the above-described embodiment illustrates an example in which the gap (distance Z) in the direction connecting the support part 50a and the pressing part 51a is longer than the length X which is the length of the short part 40a of the protrusion 40. The present invention, however, is not limited to this, and the distance Z of the gap may be shorter than the length X of the short part 40a in some cases. The relationship between the distance Z of the gap and the length X of the short part 40a of the protrusion 40 is not limited to the example illustrated in the above embodiment as long as the load applied to the windshield 1 is the minimum load that would not affect the installation of the windshield 1 onto the vehicle body 11. The similar applies to the protrusion 41, so the description of the protrusion 41 is omitted.

The present invention is not limited to the above-described embodiments, but may include various types of modification. For example, the above-described embodiments give detailed explanation just to allow the present invention to be clearly understood. Therefore, the present invention is not limited to the case having all of components in the configuration.

In addition, a part of configuration of an embodiment can be replaced with a part of configuration of another embodiment. A part or the configuration of another embodiment can be added to a certain embodiment.

Furthermore, it is possible to modify a portion of the configuration of each of the embodiments, such as addition, deletion, and replacement from another configuration.

Furthermore, any combination of the constituent elements of the individual embodiments described above is included in the present invention.

<Supplementary Note 1>

The present invention described above provides

1.

an image capture device characterized by including:

an image capture unit (for example, a camera unit 30, a camera unit 31, and a stereo camera 2) for capturing an image; and a holding part (for example, a bracket 4) for holding the image capture unit, in which the image capture unit includes a part to be supported (for example, a protrusion 40 and a protrusion 41) having a short part (for example, a short part 40a) of a prescribed length and a long part (for example, a long part 40b) longer than the length of the short part, the holding part includes: a support part (for example, a support part 50a and a support part 50b) for supporting the part to be supported; and a pressing part (for example, a pressing part 51a and a pressing part 51b) provided to face the support part and that generates a pressing force in a direction of the support part, and when the part to be supported is positioned between the support part and the pressing part, the part to be supported can be switched between a first state where the short part is positioned in a direction connecting the support part and the pressing part and a second state where the long part is positioned in a direction connecting the support part and the pressing part and where a pressing force stronger than in the first state is received by the pressing part, leading to an effect that it is possible to provide an image capture device capable of reducing a load onto a window glass to which a bracket (holding part) is bonded, at a time of attaching an on-vehicle camera (image capture unit) to the bracket.

The present invention also provides

2.

the image capture device according to 1., in which a distance (for example, a distance Z) between the support part and the pressing part is longer than a length (for example, length X) of the short part and shorter than a length (for example, length Y) of the long part, leading to an effect that since the distance between the support part and the pressing part is longer than the length of the short part, it is possible to suppress occurrence of hindrance at the time of inserting the short part between the support part and the pressing part, making it possible to suppress application of load onto the window glass to which the bracket is bonded.

The present invention also provides

3.

the image capture device according to 1., in which the part to be supported pivots when being positioned between the support part and the pressing part so as to be able to switch between the first state and the second state, leading to an effect that the first state and the second state can be switched by pivoting, making it possible to easily secure the image capture unit to the holding part while reducing the load applied to the window glass to which the bracket is bonded.

The present invention also provides

4.

the image capture device according to 1., in which the support part has a shape of a hook (for example, a recess having a surface 50aa and a surface 50ab), leading to an effect that it is possible to firmly support the part to be supported by the support part and the pressing part without causing wobbling in the part to be supported between the support part and the pressing part.

The present invention also provides

5.

the image capture device according to 1., in which the image capture unit includes a front-side part to be supported (for example, a protrusion 42) in front of the part to be supported, the holding part includes a front-side support part (for example, a support part 52) for supporting the front-side part to be supported, and the front-side support part supports the front-side part to be supported in the second state, leading to an effect that an image capture unit can be supported with enhanced stability by the support part and the front-side support part.

The present invention also provides

6.

an image capture unit for capturing an image, the image capture unit being held by the holding part, the image capture unit including a part to be supported having a short part having a prescribed length and a long part longer than the length of the short part, the holding part includes: a support part which supports the part to be supported; and a pressing part which is provided facing the support part and which generates a pressing force in the direction of the support part, and when positioned between the support part and the pressing part, the part to be supported can be switched between a first state in which the short part is positioned in a direction linking the support part and the pressing part and a second state in which the long part is positioned in the direction linking the support part and the pressing part, and receives a stronger pressing force than that in the first state from the pressing part, leading to an effect that it is possible to provide an image capture unit capable of reducing a load onto a window glass to which a bracket (holding part) is bonded, at a time of attaching an on-vehicle camera (image capture unit) to the bracket.

REFERENCE SIGNS LIST 1 windshield
2 stereo camera
3 housing
4 bracket
5 connecting member
10 vehicle
11 vehicle body
30 camera unit (left camera unit)
31 camera unit (right camera unit)
40 protrusion (left protrusion)
41 protrusion (right protrusion)
42 protrusion (front protrusion)
50a support part (left support part)
50b support part (right support part)
51a pressing part (left pressing part)
51b pressing part (right pressing part)

52 support part (front support part)
53*a* plate spring
53*b* plate spring
54 plate spring

The invention claimed is:

1. An image capture device comprising:
an image capture unit for capturing an image; and
a holding part for holding the image capture unit,
wherein the image capture unit includes a part to be supported provided with a short part having a prescribed length and a long part having a longer length than the short part,
the holding part includes: a support part which supports the part to be supported; and
a pressing part which is provided facing the support part and which generates a pressing force in the direction of the support part, and
when positioned between the support part and the pressing part, the part to be supported is switchable between a first state in which the short part is positioned in a direction linking the support part and the pressing part and a second state in which the long part is positioned in the direction linking the support part and the pressing part and that receives a stronger pressing force than in the first state from the pressing part, wherein
the part to be supported pivots when being positioned between the support part and the pressing part so as to be able to be switched between the first state and the second state.

2. The image capture device according to claim 1, wherein a distance between the support part and the pressing part is longer than a length of the short part and shorter than a length of the long part.

3. The image capture device according to claim 1, wherein the support part has a hook shape.

4. The image capture device according to claim 1, wherein the image capture unit includes a front-side part to be supported in front of the part to be supported,
the holding part includes a front-side support part for supporting the front-side part to be supported, and
the front-side support part supports the front-side part to be supported in the second state.

5. An image capture unit for capturing an image,
the image capture unit configured to be held by a holding part,
the image capture unit comprising a part to be supported provided with a short part having a prescribed length and a long part having a longer length than the short part,
wherein the holding part includes: a support part which supports the part to be supported; and a pressing part which is provided facing the support part and which generates a pressing force in the direction of the support part; and
when positioned between the support part and the pressing part, the part to be supported is switchable between a first state in which the short part is positioned in a direction linking the support part and the pressing part and a second state in which the long part is positioned in the direction linking the support part and the pressing part and that receives a stronger pressing force than in the first state from the pressing part, wherein
the part to be supported pivots when being positioned between the support part and the pressing part so as to be able to be switched between the first state and the second state.

6. The image capture device according to claim 1, wherein the first state is a state in which the short part is positioned in a direction linking the support part and the pressing part, and
the second state is a state in which the long part is positioned in the direction linking the support part and the pressing part and that receives a stronger pressing force than in the first state from the pressing part.

7. The image capture unit according to claim 5, wherein the first state is a state in which the short part is positioned in a direction linking the support part and the pressing part, and
the second state is a state in which the long part is positioned in the direction linking the support part and the pressing part and that receives a stronger pressing force than in the first state from the pressing part.

* * * * *